(12) United States Patent
Bartels et al.

(10) Patent No.: US 6,491,892 B1
(45) Date of Patent: Dec. 10, 2002

(54) METHOD FOR THE EXTRACTION OF A SUBSTANCE FROM A STARTING MATERIAL

(75) Inventors: Paul Vincent Bartels, Wageningen (NL); Stephan Henrick Dick Hulleman, Heelsum (NL); Hubertus Cornelis Langelaan, Wageningen (NL)

(73) Assignee: Institut voor Agrotechnologisch Onderzoek (ATO-DLO), Wageningen (NL)

( * ) Notice: Subject to any disclaimer, the term of this patent is extended or adjusted under 35 U.S.C. 154(b) by 0 days.

(21) Appl. No.: 09/554,879

(22) PCT Filed: Nov. 19, 1998

(86) PCT No.: PCT/NL98/00662

§ 371 (c)(1),
(2), (4) Date: Jul. 17, 2000

(87) PCT Pub. No.: WO99/26707

PCT Pub. Date: Jun. 3, 1999

(30) Foreign Application Priority Data

Nov. 20, 1997 (NL) .............................................. 1007588

(51) Int. Cl.[7] .............................................. B01D 11/00
(52) U.S. Cl. ..................................... 423/658.5; 100/935
(58) Field of Search ...................... 423/658.5; 422/273; 100/935; 426/489, 616, 629, 650, 655

(56) References Cited

U.S. PATENT DOCUMENTS

| | | | |
|---|---|---|---|
| 2,200,983 A | | 5/1940 | Dinley |
| 2,547,577 A | | 4/1951 | Hamacher et al. |
| 5,094,866 A | * | 3/1992 | Devic |
| 5,417,155 A | * | 5/1995 | Tatsuzawa et al. |

FOREIGN PATENT DOCUMENTS

| | | | |
|---|---|---|---|
| FR | 2 619 514 | | 2/1989 |
| JP | 62-126935 | * | 6/1987 |
| WO | WO 90/10484 | | 9/1990 |
| WO | 97/43113 | * | 11/1997 |

* cited by examiner

*Primary Examiner*—Steven Bos
(74) *Attorney, Agent, or Firm*—Young & Thompson

(57) ABSTRACT

The starting material is conveyed in an extruder through zones of high and low pressure formed by different screw elements of opposing pitch. An extractant is fed in the high pressure zones located upstream of the screw elements of opposing pitch. The extractant then flows in a direction countercurrent to a direction of transport of the starting material and is discharged via a discharge opening located in or close to the low pressure zone, downstream of a screw element of opposing pitch.

4 Claims, 1 Drawing Sheet

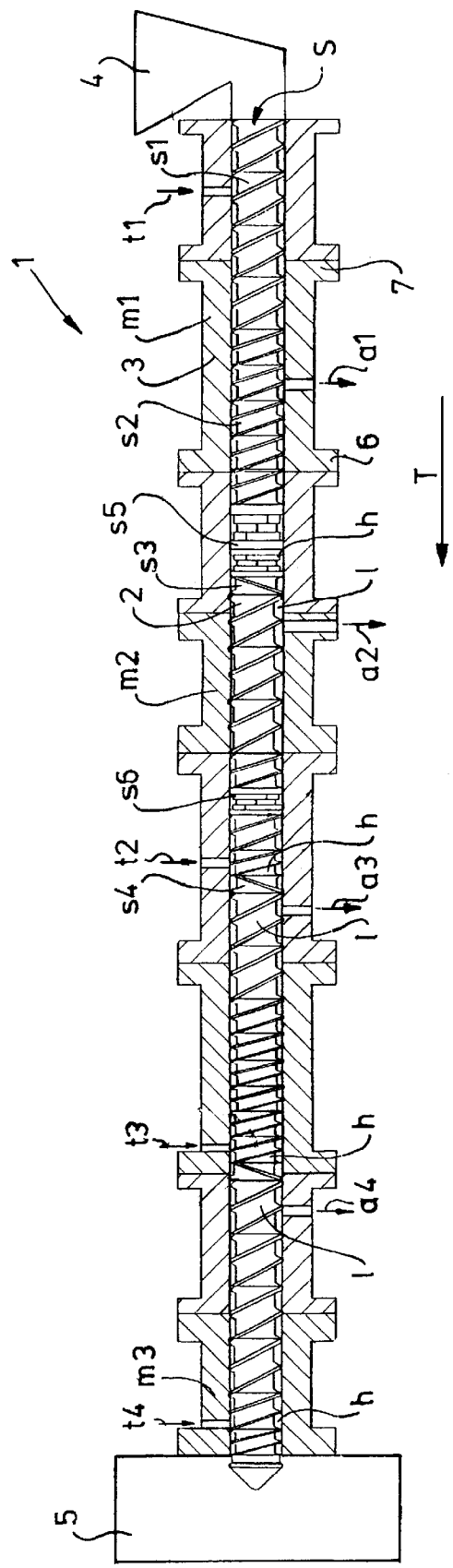

METHOD FOR THE EXTRACTION OF A SUBSTANCE FROM A STARTING MATERIAL

FIELD OF THE INVENTION

The invention relates to a method for the extraction of a substance from a starting material, wherein the starting material is brought together with an extraction fluid in an extruder. The starting material is moved along an extrusion channel in a conveyor device. The extruder contains at least two pressure-raising elements which are spaced apart, with a low pressure zone between the elements and a high pressure zone located downstream thereof.

BACKGROUND OF THE INVENTION

In the foodstuffs industry, organic waste streams and specific product streams frequently contain high value components. These components are usually extracted from the product streams batchwise. Since the starting material is usually pressed, followed by precipitation, washing out by means of boiling of by means of a belt press, large quantities of extraction fluid are used.

It is also known to produce bleached chemical-mechanical wood pulp from wood chips by feeding the wood chips through a twin screw extruder such as that manufactured by Clextra under the trade name BIVIS. In this process a number of screw elements with opposing pitch (reverse screw elements) are used in the casing of the extruder to form high pressure zones for intensive kneading of the product. Chemicals such as NaOH and $NaHSO_3$ as well as steam are injected into the casing of the extruder and discharged from the extruder in a direction concurrent with the direction of transport of the starting material.

A process of this type has the disadvantage that it is not optimum for extraction and that the starting material can be forced out of the casing of the extruder under pressure at the tapping points. As a result, the pressures which can be used are limited and the concentrations of substances which can be extracted in an extraction process are usually relatively low.

FR 2 619 514 describes an extraction process using a twin screw extruder, wherein extraction takes place at relatively low pressures in a number of concurrent processes connected in series.

WO 90/10484 discloses an extraction method in which the starting material is moved by means of a single screw extruder in a direction countercurrent to a solvent. With the known apparatus having a single screw, expression of the starting material with extractant in the compression zone is possible only to a limited extent since if too much fluid is used no further solid is transported. Extraction under high pressure is also not possible in the known apparatus, while the flow of the starting material and the extractant are highly integrated, so that the extraction is relatively inefficient.

SUMMARY OF THE INVENTION

It is therefore an aim of the present invention to provide an extraction process in which relatively high pressures can be used, very good mixing of the starting material and the extraction fluid occurs, a high yield is achieved and the risk of the starting material being forced out of the casing through the discharge openings is reduced.

A further aim of the present invention is to provide an extraction process which can be operated continuously and various substances can be extracted from a starting material with high selectivity.

To this end the method according to the present invention is characterized in that the extraction fluid is fed to the extruder via a feed opening in or close to the high pressure zone, is then brought to the low pressure zone in a direction countercurrent to the direction of transport of the starting material and is discharged from the extruder via a discharge opening in or close to the low pressure zone. The starting material is continually supplied to the low pressure zone in the direction of transport and continuously discharged from the high pressure zone in the direction of transport.

According to the invention, the extraction fluid is supplied to the extruder and fed in a countercurrent direction over a continuous supply of the starting material through the extrusion channel. Surprisingly, it has been found that the material to be extracted is highly comminuted in the high pressure zones, so that a very high surface area/volume ratio is obtained and very good mixing with the extraction fluid (solvent) occurs. Efficient extraction is possible by means of the countercurrent flow, with a very high extraction yield. By placing the discharge openings for the extraction fluid in or close to the low pressure zones, the pressure in the extraction apparatus is raised to relatively high levels, such as, for example, higher than 10 bar, without the starting material being forced out through the discharge openings. At these high pressures the solubility of the material to be extracted in the extraction fluid is high and extraction can take place efficiently. At the high pressures, the substance to be extracted can be dissolved more rapidly by passing through an arbitrary solvent such as, for example, water or a salt solution in a countercurrent direction. By separate discharge of the extraction fluid from the extruder, while the starting material is transported further along the extrusion channel, a high grade substance, such as an oligomer or polymer condensate, can be obtained efficiently and continuously from a low grade residual stream or waste stream. The extracted, insoluble comminuted residual fraction can be further transported to a second low pressure zone and a second high pressure zone. An extraction fluid once again is supplied, which extraction fluid is discharged close to the second low pressure zone and a further substance can be extracted from thee starting material, with a relatively high selectivity. The properties of the extracted product can be controlled by the selection of the extraction fluid used, the specific pressures and temperatures in the extruder, the starting material/extraction fluid ratio, contact time and the like.

Examples of extracted substances include secondary metabolites, such as odor substances, colorants and flavorings, for example carvone and limonene from caraway seeds, vanilla from vanilla beans, pentosans from wheat waste, pectin from the skins of citrus fruits and inulin from chicory. Furthermore, the method according to the invention can also be used for non-organic materials,- such as the extraction of catalyst residues from polymers. With the method according to the present invention it is also possible advantageously to use an extraction fluid in the supercritical state, such as $CO_2$ at 75 bar and 35° C. The supercritical state can be maintained over the entire extraction length.

In one embodiment of the method according to the invention, after the extrusion step the extruded starting material is fed to drying or press means to produce, for example, fiberboard, cattle feed pellets and covering for a stall floor.

The extraction apparatus according to the invention comprises an extruder, for example a multi-screw extruder, with a discharge opening in the wall of the extrusion channel in or close to the low pressure zone for discharging the extraction fluid. The discharge opening is provided with screening means. M A feed opening is made in the wall of the extrusion channel in or close to the high pressure zone located downstream of the low pressure zone.

Preferably, the pitch of the screw in the extruder is relatively large in the low pressure zones and is relatively small in the high pressure zones. In this way the pressure in the extruder can be controlled in a simple manner by adjusting the pitch of the screw. High pressure zones and low pressure zones can also be achieved by locally reversing the pitch of the screw with respect to the pitch of the transport part of the screw.

The extraction apparatus according to the invention is of modular construction and is made up of modules which can be coupled to one another. The modules can be coupled to one another by coupling elements such as external flanges which can be connected to one another. By adjusting the number of modules, various substances can be extracted from the starting material as required with the aid of a number of different extraction fluids. The strength of the dynamic seals which are formed by the screw elements with opposing pitch and the pressure which these seals are able to withstand depend on the geometry of the screw element and on the Theological properties (the way in which the material deforms under the influence of a force) of the material with which the extruder is filled. The Theological properties can be adjusted b mixing the starting material with a plasticizer or lubricant. For example, with caraway seeds as the starting material, the addition of a small amount of water has a substantial influence on the properties in the seals.

BRIEF DESCRIPTION OF THE DRAWING

The invention will be explained in more detail with reference to the single appended FIGURE which illustrates the extraction apparatus according to the invention.

DETAILED DESCRIPTION OF THE INVENTION

The FIGURE shows an extraction apparatus 1 having an extrusion channel 2 surrounded by a cylindrical wall 3. Two screws S, which partially engage one another and have screw elements or modules S1, S2 of different pitch, have been placed in the extrusion channel 2. Screw elements S3, S4 having a pitch which is opposite to the pitch of the screw elements S1, S2 are also accommodated in the extrusion channel 2. Kneading elements S5, S6 can be accommodated between the screw elements. By means of the screw elements S1, S2 of different pitch, the kneading elements S5, S6 and the screw elements S3, S4 of opposing pitch, high pressure zones h are formed in the extrusion channel 2. The high pressure zones h are each located upstream of the screw elements Se, S4 of opposing pitch, in the vicinity thereof. Zones of a relatively low pressure are located in the extrusion channel 2 in positions which are indicated by reference symbol "1", in each case downstream of the screw elements S3, S4 of opposing pitch.

Feed openings t2, t3 and t4 have been made in the wall 3 at the location of the high pressure zones h. The extraction fluid can be introduced by means of an injection device through the feed openings t t2, t3 and t4 into the extrusion channel t2. Discharge openings a t2, a3 and a4 have been made in the wall 3 at the location of the low pressure zones 1. The extraction fluid introduced through a feed opening t t2, t3 and t4 moves over the material moved by the screw S in a direction counter-current to a direction of transport T to a respective discharge a t2, a3 and a4. With this arrangement an effective extraction space is formed between each two screw elements S3, S4 of opposing pitch spaced some distance apart. Because the discharge openings a t2, a3 and a4 are located close to the low pressure zone of such an extrusion space, the pressures in the extrusion space can be raised relatively high without the transported material being forced out through the discharge openings. As a result of the high pressures, efficient extraction is possible because the solubility of the material to be extracted in the extractant is relatively high at these pressures. The discharge openings a t2, a3 and a4 are each provided with a screening device, so that only the extraction fluid is able to pass through them, while the starting material remains in the extrusion channel t2.

The starting material can be fed to the extrusion channel t2 via a filling chute 4. A reactant or extraction fluid can be added to the starting material at the location of the filling chute 4. It is also possible to carry out a pretreatment of the starting material in a multi-current extraction step by adding a reactant through a feed opening t1, and discharging the reactant through a discharge opening a1. A drying installation or press installation 5, in which fiberboard, pellets and the like can be formed from the extracted residual material, is located at the end of the extraction apparatus 1.

The length of the extraction apparatus as shown in the FIGURE is, for example, t2 meters for a diameter of 44 mm. Preferably, the apparatus is of modular construction with modules m1, m t2, m3 which can be coupled to one another. Each module m1, m t2 m3 has external flanges 6, 7 which, by means of bolts which are not shown in the FIGURE, can be coupled to similar flanges of an adjacent module. Each module m1, m t2 has a conveyor screw and/or a screw element of opposing pitch and/or a kneading element and can be provided with a feed opening or a discharge opening in the wall 3. By use of the extraction apparatus described above an open system is obtained in which very high pressures can nevertheless be achieved.

In order to illustrate the effectiveness of the extraction process according to the present invention, an extraction of sugars from chicory was performed with the aid of a Clextral model BC45 co-rotating twin screw extruder.

The screw construction is modular and in accordance with the principles as shown in the single FIGURE. An extruder was constructed from 14 separate screw elements according to Table 1:

TABLE 1

| Element no. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Screw type | TZ | TZ | TZ | TZ | RSE | RSE | TZ | TZ | TZ | TZ | RSE | RSE | RSE | Ring |
| Length [mm] | 100 | 50 | 100 | 100 | 50 | 50 | 200 | 200 | 100 | 50 | 50 | 50 | 50 | 100 |
| Pitch [mm] | 50 | 35 | 25 | 15 | −25 | −15 | 50 | 35 | 35 | 35 | −25 | −25 | −15 | |
| Slot size [mm] | | | | | 10 | 8 | | | | | 4 | 6 | 12 | |

The screw type used is indicated by TZ, which indicates a screw element of trapezoidally shaped pitch. The term RSE relates to a reverse screw element (or a crew element having an oppposingly directed pitch, such as the elements S3, S4 in the FIGURE). The term Ring relates to a neutral element without a conveyor action. Each reverse screw element can be provided with a hole, the diameter of which is shown in the fifth row of Table 1. The inlet opening for injection of the extraction fluid, or solvent, was at the level of the tenth screw element, having a pitch of 35 mm. The upstream discharge opening was at the seventh screw element, having a pitch of 50 mm. The length of the extraction path, or the distance between the feed opening and the discharge opening, is approximately 50 cm. A discharge opening for a first expression of the raw material without the addition of extraction fluid or solvent is located further upstream, at the level of the first screw element, having a pitch of 50 mm.

With the aid of such a configuration it is possible to achieve a stable countercurrent extraction process at a speed of 25 revolutions per minute, with an amperage of 8 ampere and a pressure at the extruder outlet of 2 bar. The temperature of the extruder wall at the feed and the discharge was 25° C. and 32° C. respectively. With these settings 210.00 g/min chicory (i.e. 186.90 g/min water and 23.10 g/min solids) were fed into the extruder. 125.66 g/min chicory (i.e. 116.49 g/min water and 9.17 g/min solids) were removed in the first expression of the raw material. The remaining 83.34 g/min chicory was brought into contact with 125.00 g/min water flowing in a countercurrent direction in the extraction zone. The component balance is given in Table 2. The sugars were analyzed for molecular size (monosaccharides, disaccharides, trisaccharides, etc.) with the aid of HPLC.

TABLE 2

| | | First expression | | Extraction zone | | | Total process | |
|---|---|---|---|---|---|---|---|---|
| | | Chicory in [g/min] | Chicory out [g/min] | Chicory in [g/min] | Water in [g/min] | Out through discharge opening [g/min] | Residue out [g/min] | Total in [g/min] | Total out [g/min] |
| Water | | 186.90 | 116.49 | 70.41 | 125.00 | 103.14 | 86.73 | 311.90 | 306.36 |
| Solids | | 23.10 | 9.17 | 13.93 | — | 2.86 | 11.27 | 23.10 | 23.31 |
| Sugars | 1 | 5.00 | 3.25 | 1.74 | — | 1.05 | 0.52 | 5.00 | 4.82 |
| | 2 | 2.69 | 1.57 | 1.12 | — | 0.53 | 0.30 | 2.69 | 2.40 |
| | 3, 4 | 1.58 | 1.19 | 0.38 | — | 0.34 | 0.09 | 1.58 | 1.62 |
| | 5, 6 | 0.90 | 0.63 | 0.27 | — | 0.23 | 0.13 | 0.90 | 0.99 |
| | 7, 8, 9 | 0.18 | 0.15 | 0.03 | — | 0.08 | 0.03 | 0.18 | 0.27 |
| Total sugars | | 10.33 | 6.80 | 3.53 | — | 2.24 | 1.07 | 10.33 | 10.10 |

The yield from the first pressing step (the ratio of the quantity of expressed sugars to the quantity of sugars in the raw material) is 65%. The yield in the extraction zone (the ratio of extracted sugars to the quantity fed into the extraction zone) is 63%. The total yield of the process (the total quantity of sugars obtained to the quantity of sugars in the raw material) is 88%.

In view of the short length over which the countercurrent extraction occurs, the extruder described is a highly efficient extractor.

What is claimed is:

1. A method for the extraction of a substance from a starting material, wherein the starting material is brought together with an extraction fluid in an extruder, wherein the starting material is moved along an extrusion channel in a conveyor device and wherein the extruder contains at least two pressure-raising elements which are located apart, with a first low pressure zone between said elements and a first high pressure zone located downstream thereof, comprising the steps of:

feeding the extraction fluid to the extruder via a feed opening at the first high pressure zone;

bringing the extraction fluid to the first low pressure zone in a direction countercurrent to a direction of transport of the starting material; and discharging the extraction fluid from the extruder via a discharge opening at the first low pressure zone, with the starting material being continually supplied to the first low pressure zone in the direction of transport and with continuous discharge of the starting material from the first high pressure zone in the direction of transport.

2. The method according to claim 1 wherein the extruder comprises at least a second low pressure zone and a second high pressure zone located downstream of the first low pressure zone and the first high pressure zone, and further comprising feeding an extraction fluid to the extruder at the second high pressure zone and discharging the extraction fluid from the extruder at the second low pressure zone.

3. The method according to claim 1, further comprising, following extraction, feeding the starting material from the extruder to drying and/or press means.

4. The method according to claim 1, wherein the starting material is an organic material.

* * * * *